US009744559B2

(12) United States Patent
Harrison

(10) Patent No.: US 9,744,559 B2
(45) Date of Patent: Aug. 29, 2017

(54) HIGH CONTRAST SURFACE MARKING USING NANOPARTICLE MATERIALS

(71) Applicant: Paul W Harrison, Los Angeles, CA (US)

(72) Inventor: Paul W Harrison, Los Angeles, CA (US)

(*) Notice: Subject to any disclaimer, the term of this patent is extended or adjusted under 35 U.S.C. 154(b) by 45 days.

(21) Appl. No.: 14/545,593

(22) Filed: May 27, 2015

(65) Prior Publication Data
US 2015/0344712 A1    Dec. 3, 2015

Related U.S. Application Data

(60) Provisional application No. 61/997,220, filed on May 27, 2014, provisional application No. 62/176,129, filed on Feb. 9, 2015.

(51) Int. Cl.
*B05D 3/06* (2006.01)
*C09D 11/322* (2014.01)
*B41M 5/26* (2006.01)

(52) U.S. Cl.
CPC ............. *B05D 3/065* (2013.01); *B41M 5/262* (2013.01); *B41M 5/267* (2013.01); *C09D 11/322* (2013.01); *B05D 3/067* (2013.01); *B41M 2205/04* (2013.01); *Y10T 428/24893* (2015.01)

(58) Field of Classification Search
CPC ........ B05D 3/065; B05D 3/067; B41M 5/262; B41M 5/267; B41M 2205/04; C09D 11/322
USPC ......................................... 428/403
See application file for complete search history.

(56) References Cited

U.S. PATENT DOCUMENTS

| | | | |
|---|---|---|---|
| 3,945,318 A | 3/1976 | Landsman | |
| 3,962,513 A | 6/1976 | Eames | |
| 4,306,012 A | 12/1981 | Scheve | |
| 4,327,283 A | 4/1982 | Heyman et al. | |
| 4,515,867 A | 5/1985 | Bleacher et al. | |
| 4,541,340 A | 9/1985 | Peart et al. | |
| 4,651,313 A | 3/1987 | Guez | |
| 4,769,310 A | 9/1988 | Gugger et al. | |
| 4,847,181 A | 7/1989 | Shimokawa | |
| 4,854,957 A | 8/1989 | Borrelli et al. | |
| 4,856,670 A | 8/1989 | Hang | |
| 4,861,620 A | 8/1989 | Azuma et al. | |
| 4,912,298 A | 3/1990 | Daniels et al. | |
| 5,030,551 A | 7/1991 | Herren et al. | |
| 5,035,983 A | 7/1991 | Kiyonari et al. | |
| 5,116,674 A | 5/1992 | Schmidhalter et al. | |
| 5,175,425 A | 12/1992 | Spratte et al. | |
| 5,359,176 A | 10/1994 | Balliet, Jr. et al. | |
| 5,397,686 A | 3/1995 | Dominick et al. | |
| 5,409,742 A | 4/1995 | Artsen et al. | |
| 5,422,146 A | 6/1995 | Adams | |
| 5,427,825 A | 6/1995 | Murnick | |
| 5,523,125 A | 6/1996 | Kennedy et al. | |
| 5,543,269 A | 8/1996 | Chatterjee et al. | |
| 5,554,335 A | 9/1996 | Fields et al. | |
| 5,609,778 A | 3/1997 | Pulaski et al. | |
| 5,637,244 A | 6/1997 | Evokhin | |
| 5,719,372 A | 2/1998 | Togari et al. | |
| 5,734,412 A | 3/1998 | Hasebe et al. | |
| 5,740,941 A | 4/1998 | Lemelson | |
| 5,760,367 A | 6/1998 | Rosenwasser et al. | |
| 5,761,111 A | 6/1998 | Glezer | |
| 5,767,483 A | 6/1998 | Cameron et al. | |
| 5,783,507 A | 7/1998 | Sakoske | |
| 5,801,356 A | 9/1998 | Richman | |
| 5,804,342 A | 9/1998 | Paz-Puglet et al. | |
| 5,985,078 A | 11/1999 | Suess et al. | |
| 6,075,223 A * | 6/2000 | Harrison | B41M 5/262 219/121.85 |
| 6,313,436 B1 * | 11/2001 | Harrison | B41M 5/262 219/121.85 |
| 6,852,948 B1 * | 2/2005 | Harrison | B41M 5/262 219/121.85 |

(Continued)

FOREIGN PATENT DOCUMENTS

| | | |
|---|---|---|
| DE | 201 136 | 7/1983 |
| DE | 215 776 A1 | 11/1984 |

(Continued)

OTHER PUBLICATIONS

Brunauer, Emmett & Teller, "Adsorption of Gases in Multi-molecular Layers," J. Am. Chem. Soc. Feb. 1938, pp. 309-319.
Cho & Kim, "Effects of Silica Nanoparticles on Photocuring Behaviors of UV-Curable Polyester Acrylate-Based Coating Systems," Macromolecular Research, vol. 13, No. 4, pp. 362-365 (2005).
Myers, "Silica Nanoparticles with Functionalized Surface Chemistries as an Alternative to Monomer-dispersed Silica Dispersions," Conference of European Coatings Congress (2011).

*Primary Examiner* — Leszek Kiliman
(74) *Attorney, Agent, or Firm* — James K. Poole, Esq.

(57) ABSTRACT

Methods and compositions are disclosed for quickly creating durable surface marks and/or decorations on substrates including metal, glass, ceramic, porcelain, natural and engineered stone, as well as plastics, polymer composites and other organic materials with color, high resolution and high contrast using inkjet technology and laser, NIR diode or UV LED energy. The improved methods and compositions are based on established and emerging sub-micron and nanoparticle technology. Most properties of nanoparticles are size dependent and do not become apparent until the particle size has been reduced to the nanometer scale. Examples of such properties include increased specific surface area, facilitating the absorption and/or scattering of visible light and laser, NIR diode or UV LED energy and the decreased melting point of such materials when their particle size is reduced to the nanometer scale. Improved results such as smoothness and durability are obtained by using nanoparticles of silica, pigments and other materials in such marking processes.

26 Claims, 10 Drawing Sheets

(56) References Cited

U.S. PATENT DOCUMENTS

| | | | |
|---|---|---|---|
| 6,855,910 B2* | 2/2005 | Harrison | B41M 5/262 219/121.85 |
| 7,371,456 B2 | 5/2008 | Nohr et al. | |
| 8,765,855 B2 | 7/2014 | Thaker | |
| 8,916,796 B2 | 12/2014 | Ramanujan et al. | |
| 9,487,435 B2* | 11/2016 | Sakoske | C04B 41/009 |

FOREIGN PATENT DOCUMENTS

| | | |
|---|---|---|
| DE | 3539047 A1 | 7/1986 |
| EP | 419 377 A1 | 3/1991 |
| EP | 0531584 | 3/1993 |
| EP | 716 135 A1 | 6/1996 |
| EP | 0761377 A1 | 3/1997 |
| EP | 782 933 | 7/1997 |
| EP | 1023184 | 2/2000 |
| EP | 1040017 | 10/2000 |
| FR | 2 772 021 | 6/1999 |
| FR | 2772021 A1 | 6/1999 |
| FR | 2 774 931 | 8/1999 |
| GB | 2 169 282 | 7/1986 |
| GB | 2 227 570 A | 1/1990 |
| GB | 2-447659 A | 9/2008 |
| JP | 62-223940 | 10/1987 |
| JP | 63-216790 | 9/1988 |
| JP | 1-194235 | 8/1989 |
| JP | 5-138114 | 11/1991 |
| JP | 6-106378 | 9/1992 |
| WO | WO 95/13195 | 5/1995 |
| WO | WO 96/03221 | 2/1996 |
| WO | WO 99/29519 | 6/1999 |
| WO | WO 99/42421 | 8/1999 |

\* cited by examiner

Electromagnetic Spectrum (Radiant Energy)

The light that is perceptible to the human eye is in the range of 400 - 750nm. Red is roughly 700nm, green 550nm and blue is 450nm. An overview of the various radiant energy sources is shown below.

Wavelength Spectrum (not to scale)

Typical Silica Nanoparticle

Typical Hydrogen - Oxygen Bond

Cross Section Photomicrograph of
Typical Silica Encapsulated Pigment Element

XRD patterns of metal oxide marking material compositions

HIGH CONTRAST SURFACE MARKING USING NANOPARTICLE MATERIALS

REFERENCE TO RELATED APPLICATIONS

This application claims the benefit of my provisional applications U.S. Ser. No. 61/997,220, filed May 27, 2014 for "METHODS AND COMPOUNDS FOR QUICKLY CREATING PERMANENT COLOR SURFACE MARKS AND/OR DECORATIONS ON METAL, GLASS, CERAMIC, PORCELAIN, NATURAL AND ENGINEERED STONE, AS WELL AS PLASTIC AND POLYMER COMPOSITE MATERIALS WITH HIGH-RESOLUTION AND HIGH-CONTRAST USING LASER OR DIODE ENERGY," and U.S. Ser. No. 62/176,129, filed Feb. 9, 2015 for "METHODS AND COMPOUNDS FOR QUICKLY CREATING DURABLE, COLOR SURFACE MARKS AND/OR DECORATIONS ON METAL, GLASS, CERAMIC, PORCELAIN, NATURAL AND ENGINEERED STONE, AS WELL AS PLASTIC, POLYMER COMPOSITE AND OTHER ORGANIC MATERIALS WITH HIGH-RESOLUTION AND HIGH-CONTRAST USING LASER OR DIODE ENERGY."

BACKGROUND

Field of the Invention

The present subject matter relates to improvements to existing marking materials and compositions for use in marking operations in conjunction with commercially available lasers and/or diodes and various methods of marking and decorating a variety of different substrate materials using such improved marking materials and compounds.

Discussion of Prior Art

Industry has long sought a simple method and marking material formulations to surface mark on metal, glass, ceramic, porcelain, natural and engineered stone, as well as plastics, polymer composites and other organic materials with five attributes. These attributes include color, high-resolution, high contrast, long term durability and speed of application.

Most well known efforts to date have only produced two, three or four of these attributes. For example, kiln firing using glass frit or metal oxide materials at kiln temperatures ranging from 100° C. to more than 1000° C. results in high-resolution, high-contrast, permanent color marks and, decorations on metal, glass, ceramic and porcelain objects. These well known processes require heating the entire substrate object along with the glass frit and/or metal oxide materials in a kiln and require different formulations of the glass frit and/or metal oxide materials depending on the substrate object to be marked or decorated. One problem with these processes is that the time factor and energy consumption are not commercially efficient enough to make the marking or decoration process economically feasible in smaller quantities. Time requirements ranging from several minutes to several hours are common. Furthermore, these processes, requiring a kiln, do not lend themselves to portability.

Another known method is shot-peening or engraving on metal. This method cannot be used on glass, ceramic, porcelain or other brittle materials because of potential surface damage and/or breakage. Where used, the method produces a relatively low-resolution, fast and permanent mark; however, color and high-contrast marking cannot be achieved.

Other known marking methods are direct and transfer printing processes. The transfer method uses a laser or electrostatically transferable toner onto an intermediate carrier in order to enhance the application of heat, or the conversion of laser energy into heat, in order to fuse the toner to the substrate surface. This method produces high-resolution and high-contrast marks or decorations with color, if desired, and is relatively fast, but lacks real long term durability. Conventional laser printers for paper are representative of such processes.

Another known direct printing process involves the use of aerosol jet deposition apparatus such as inkjet printers. In many cases environmentally hazardous solvents are mixed with combinations of organic and/or inorganic components, in order to improve deposition efficiency, performance, adhesion, resolution, appearance and durability. These organic resin or polymer binder systems usually comprise a monomer, oligomer, photopolymerization initiator and various additives (stabilizers, fillers, pigments, etc.) and are used with an ultraviolet lamp curing step which is relatively time consuming; however, even with the use of solvents and ultraviolet curing there remains a lack of long term durability to abrasion, outdoor weather and sunlight conditions.

Another transfer printing method, known as dye-sublimation, employs a printing process that uses heat to transfer dyes onto the surfaces of materials such as plastic, certain papers, or fabric coated with polymeric materials such as polyesters. This process, which takes several minutes, can also be used to mark or decorate the surface of various polymer coated metal, glass, ceramic and porcelain objects. A diffusion of the dye into the polymer material or coated substrate surface is accomplished by a heated, pressurized air step transferring the desired image from a printed transfer label. The resulting mark or decoration is only as durable as the polymer material or coating, but lacks long term ultraviolet stability.

Another related group of marking or decorating methods is based on the use of laser energy combined with different mixtures comprising glass frit, pyrophilic materials, mineral clays, base metals, metal oxides or combinations thereof in order to bond a marking or decoration onto the surface of various metal, glass, ceramic, porcelain, plastic, polymer composite, natural or engineered stone objects. Descriptions of the ingredients and components for these mixtures and methods for laser marking or bonding technology can be found in U.S. Pat. No. 4,769,310 to Gugger et al., U.S. Pat. No. 5,030,551 to Herren et al. and European Patent No. 1,040,017 B1 to Hory et al. Applicant Paul W. Harrison's U.S. Pat. Nos. 6,075,223 and 6,313,436 and European Patent No. 1,040,017 B1, all of which are incorporated herein by reference, disclose flexible methods for marking metals, plastics, ceramic materials, glazes, glass ceramics and glasses without damaging the surfaces thereof and without specific requirements being made of the substrates, these methods involving the use of glass frit based or mixed organic materials or mixed metal oxides in layers for laser marking.

Other relevant patents include that of Nohr et al., U.S. Pat. No. 7,371,456, which disclose nanoparticle-based recording media, inks and ink compositions, methods of making such materials and methods for making nanoparticles plus related technologies. U.S. Pat. No. 8,916,796 to Ramanujan et al. discloses methods and apparatus for depositing and curing nanoparticle-based inks. Thaker's U.S. Pat. No. 8,765,855 discloses ink formulations comprising a binder and at least one marking component, which comprises at least one metal oxide or oxyanion and at least one oxidizing/reducing agent, and absorbs laser irradiation between wavelengths of 780-10,600 nm, thereby causing the formulation to change color. The compounds used can be in particulate form with average particle sizes of 10 nm to 10 micrometers.

U.S. Published Application No. U.S. 2014/0370247 A1 of Detric et al., assigned to Ferro Corporation, discloses laser marking compositions and related methods, in which the compositions can include a molybdenum metal complex, a tungsten metal complex, or combinations thereof. Marks formed on a substrate using the compositions and methods are stated to exhibit increased contrast and improved substrate bonding. The particulate materials used in the compositions can have various sizes, in one embodiment in the range of about 0.1 to 55 microns.

A need remains for marks that exhibit increased contrast and color, if desired, such that the decorations or marks are more readily visible. In addition, for marks subject to surface abrasion, chemical reactions or exposure to environmental elements it would also be beneficial to improve the chemical bonding between the marking composition and the underlying substrate material to prevent or reduce the potential for abrasion or removal. Accordingly, in view of these and other concerns, a need exists for improved marking compositions and methods for using such materials and compositions.

SUMMARY

This subject matter relates broadly to a rapid method of durable, high contrast and high resolution surface marking with color, if desired. Permanence refers to the degree with which a marking or decoration retains its original physical and mechanical properties; such as stability, adhesion, surface finish and color over extended periods of time. It is influenced by both internal factors (e.g., its material components and chemical composition) and external conditions (the effects of light, atmospheric conditions, environmental contaminants, mechanical abrasion and the presence of chemical agents, etc.). Durability is the property of resisting deterioration while in use, that is, the normal wear-and-tear of everyday activity such as the ability of sandpaper to hold together until the user finishes his work. Durability refers primarily to the ability of a marking or decoration to fulfill its intended function during intensive usage in normal performance situations without reference to extended time periods. Associated with the concept of permanence is that of durability; the two are interrelated, although they are not synonymous. In a sense, permanence may be defined as the retention of durability. Permanence and durability must be defined with respect to the ultimate use of a marking or decoration, as one organic composition might be expected to last for 50 years and another, inorganic composition, to last indefinitely.

The difficulties and drawbacks associated with previously known materials and practices are addressed in the present compositions and methods for laser marking. More particularly they are concerned with improvements in printhead deposition technology and associated inks, fluids, bonding compounds or compositions and materials based on established and emerging sub-micron and nanoparticle technology. Most properties of nanoparticles are size dependent and do not become apparent until the size has been reduced to the nanometer scale. The high surface to volume ratio coupled with the size effects (quantum effects) of such nanoparticles introduces many size-dependent phenomena, including new or improved physical, chemical and mechanical properties. Examples of such phenomena are the increased specific surface area facilitating the absorption and/or scattering of visible light and laser, diode or other radiant energy, as well as the decreased melting point of bulk particulate materials when their particle size is reduced to the nanometer scale.

Nanoparticles are of great scientific interest as they are, in effect, a bridge between bulk particulate materials and atomic or molecular structures. Conventional bulk materials have constant or consistent physical properties regardless of their particle size; however, at the nano-scale, particle size-dependent properties are often observed. Thus, the properties of such materials change as their size approaches the nanoscale and as the proportion or percentage of a particle's atoms at the surface of a material becomes significant. For bulk materials containing particles larger than one micron, the percentage of atoms at the surface is insignificant in relation to the number of atoms in the total bulk of each particle of the material. The interesting and sometimes unexpected properties of nanoparticles are therefore primarily due to the large specific surface areas of the materials, which dominates the contributions made by the small mass of the material.

Nanoparticles often possess unexpected optical properties, as they are small enough to confine their electrons and produce quantum effects. Nanoparticles are generally smaller in diameter than the wavelengths of visible light. The color they display is a result of the interaction of light with the surfaces of the nanoparticles; this interaction is called Plasmon resonance. The color changes as the sizes and distance between the nanoparticles vary. Different sized nanoparticles of gold, silver and copper display a rainbow of colors in water or solvent based colloidal dispersions based on their size and shape. For example: 20 nm silver nanospheres display yellow, 40 nm gold nanospheres display pink, 12 nm gold nanospheres display red, 200 nm silver nanospheres display light blue, 120 nm silver nanoplates display dark blue and 60 nm silver nanoplates display green. Silver nanoparticles melt at lower temperatures (~300° C. to ~750° C. depending on size), as compared to standard bulk particulate silver (960° C.). These materials are available commercially in preparations designed to produce specific colors, and it is expected that similar interesting results could be obtained from other noble metals such as platinum and palladium. For duplicating or designing various colors, the Hunter Lab Scale, described in U.S. Published Patent Application No. U.S. 2014/0370247 (which is incorporated herein by reference); can be used as an aid.

The absorption of solar radiation is much higher in materials composed of nanoparticles than it is in thin films or continuous sheets of the same bulk materials. In both solar photovoltaic (PV) and solar thermal applications, by controlling the size, shape, and material of the particles, it is possible to significantly improve the absorption of solar radiation.

What would appear ironic is that the changes in the physical properties of nanoparticles with size are not always predictable or desirable. For example, ferromagnetic materials smaller than 10 nm can switch their magnetization direction using room temperature thermal energy, thus making them unsuitable for electronic memory storage applications.

Solutions and colloidal suspensions of nanoparticles are possible since the interactions of the particle surfaces with water or a solvent is strong enough to overcome density differences, which otherwise usually results in a particulate material either sinking or floating in a liquid. Nanoparticles called Janus particles are particularly effective for stabilizing emulsions. Janus particles are special types of nanoparticles whose surfaces have two or more distinct physical properties. The unique bifunctional surfaces of Janus nanoparticles allow two different types of chemistry to occur on the same particle. The simplest case of a Janus nanoparticle is achieved by dividing the nanoparticle into two distinct parts, each of them either made of a different material, or bearing different functional groups. For example, a Janus nanoparticle may have one-half of its surface composed of hydrophilic groups and the other half hydrophobic groups. This gives these particles unique properties related to their asymmetric structure and/or functionality. They can self-assemble at water/oil interfaces and act as solid surfactants. These and additional phenomena often eliminate the need for added surfactants or other anti-settling components.

Plasmonic Nanoparticles are particles whose electron density can couple with electromagnetic radiation of wavelengths that are far larger than the particle itself. What differentiates these particles from normal surface plasmons is that plasmonic nanoparticles also exhibit interesting scattering, absorbance, and coupling properties based on their geometric shape and relative positions. These unique properties have made them a focus of research in many applications including solar cells, spectroscopy, signal enhancement for imaging, and cancer treatment.

Plasmons are the oscillations of free electrons, that are the consequence of the formation of a dipole in the material due to exposure to electromagnetic radiation. The electrons migrate in the material to restore its initial state; however, the light waves oscillate, leading to a constant shift in the dipole that forces the electrons to oscillate at the same frequency as the light. This coupling occurs when the frequency of the light is equal to or less than the plasma frequency and the scattering and absorbance characteristics are directly related to the intensity of a given frequency to be scattered or absorbed. Many processes exist for fabricating plasmon nanoparticles, depending on the desired size and geometry. Changing the geometry and size of the nanoparticles can be used to manipulate the optical activity, visible color and other properties of the marking material or compound.

The specific surface area of the particles is the summation of the areas of the exposed surfaces of the particles per unit mass. There is an inverse relationship between particle size and surface area. The method of Brunauer, Emmett and Teller (BET) is commonly used to determine the total surface area. The BET theory aims to explain the physical adsorption of gas molecules on a solid surface and serves as the basis for an important analysis technique for the measurement of the specific surface area of a material. In 1938, Stephen Brunauer, Paul Hugh Emmett and Edward Teller published the first article about the BET theory in the Journal of the American Chemical Society. The BET theory refers to multi layer adsorption, and usually adopts non-corrosive gases (like nitrogen, Ar, CO2 etc.) as adsorbates to determine the surface area data.

The most common technology for the determination of the particle size distribution of nano and sub-micron liquid dispersions typically is photon correlation spectroscopy (PCS). PCS is a method that depends on the interaction of light with particles. The light scattered by nanoparticles in suspension will fluctuate with time and can be related to the average particle diameter, morphology and particle size distribution.

Transmission electron microscopy (TEM), scanning electron microscopy (SEM) and X-Ray diffraction (XRD) can also yield information such as particle sizes, size distributions and morphology of the nanoparticles. In particle size measurements, microscopy is the only method in which the individual particles are directly observed and measured.

Particle size, morphology and particle size distribution remain core measures in determining the functional properties of materials, in solutions and colloidal suspensions. Color density, opacity and viscosity depend directly upon average particle size, morphology and particle size distribution. As customer demands grow, the need to fully understand agglomeration and dispersion stability increases. Techniques that address particle size in the sub 100 nm range have become more important in evaluating the physical, chemical and mechanical properties of these nanoparticle dispersions.

Pigments are widely used as colorants, for example, in paints, varnishes, polymers, toners, coatings, and inks. Such currently used and generally available pigments have average particle sizes in the range of 1 to 10 microns. To achieve these particle sizes, mechanical devices are most often used to comminute relatively large solid particulate matter into smaller particles. The most common mechanical devices used include ball mills, sand/bead mills, roll mills, disc mills, jet mills, rotor-stator mixers or high-pressure homogenizers. All of these devices require moving parts in order to generate the mechanical forces required to break up the pigment particles. Milling times of several hours are typical, with certain pigments requiring a day or longer in order to break up, or comminute, the particles. Moreover, comminution of the pigment by contact with the milling media results in pigment surfaces exhibiting a high number of surface asperities, a large variation in particle size, and significant variations in particles and their properties from batch to batch. Furthermore, contamination of the dispersions from the mechanical parts of the milling equipment can result due to the intimate contact of the pigment with the milling media.

In particular, for the manufacturing of superfine particle size solutions or colloidal dispersions, ultrasound has some advantages, when compared with common particle size reduction equipment. Ultrasonication allows for the processing of high-concentration and high-viscosity dispersions—therefore reducing the volume to be processed. Ultrasonic milling is especially suited for processing nano-size materials, such as glasses, ceramics, metals, clays, polymers and other organic materials.

The high surface area to volume ratio of nanoparticles provides a tremendous driving force for diffusion, especially at elevated temperatures. Chemical bonding can take place at lower temperatures, over shorter time scales than for larger particles. Such nanoparticles and the processing thereof are available from nanoComposix, Inc. of San Diego, Calif., Nanophase Technologies Corporation of Romeoville, Ill. and Sigma-, Aldrich Corporation of St. Louis, Mo., among others.

Moreover, nanoparticles have been found to impart some extra properties to various day to day products. For example, the presence of titanium dioxide nanoparticles imparts what is called the self-cleaning effect, i.e. a high resistance to sticking of materials which come into contact with such substrate surfaces. Zinc oxide nanoparticles are used in sunscreen products due to their superior UV blocking properties compared to its bulk equivalent and, with the size being nano-scale, the particles cannot be observed.

The preparation and specifications of the fluids, marking materials and compositions and bonding methodology disclosed herein are for marking or decorating on vitreous, metallic, plastic, ceramic, stone or organic surfaces, preferably by means of laser, near infrared (NIR) diode or ultraviolet (UV) LED systems, which preferably can be computer controlled. FIG. 1 depicts the electromagnetic spectrum of radiant energy and the wavelengths provided by the various sources of such energy.

A laser is a device that generates an intense beam of coherent monochromatic light (or other electromagnetic radiation) by stimulated emission of photons from excited atoms or molecules. The most popular and commercially available lasers are Diode Pumped Solid State (DPSS), Nd:YAG and Ytterbium fiber at a wavelength of approximately 1064 nm as well as $CO_2$ lasers at 10,600 nm. Lasers are used in drilling and cutting, alignment and guidance, and in surgery; the optical properties are most commonly used in marking, bonding, cutting, welding and other material surface treatments, as well as holography, various medical applications, scanning of bar codes and in the recording and playing of compact discs.

FIG. 8 illustrates the configuration of a laser enclosure (140) containing a laser beam steering mechanism to move a focused laser spot (142) over the deposited marking material composition (114) on the substrate surface (122) moving in the indicated direction (144) thereby creating a durably bonded marking in the desired form (120), as disclosed in Applicant's '436 patent in column 9.

An LED is a generic term or acronym for Light Emitting Diode, which is a solid state p-n junction device which emits electromagnetic light energy when forward biased. Unlike incandescent lamps which emit light over a very broad range of wavelengths, LEDs emit light over such a narrow bandwidth that they appear to be emitting a single "color". Their small size, long operating lifetimes, low power consumption, compatibility with solid state drive circuitry, and relatively low cost, make LEDs the preferred light source in many applications. LEDs can be manufactured to emit light in the ultraviolet (UV) range at a wavelength of approximately 400 nm which is shorter than visible light. Such UV LED arrays are now being used for various UV curing applications. Power densities approaching 5 W/cm$^2$ are now possible, and this, coupled with recent developments in photoinitiator, monomer, oligomer and resin formulations make UV LED-curing of certain marking materials and other compounds possible.

NIR Diodes and diode bars generally emit light in the near infrared wavelength range of 850 nm to 1000 nm, which is longer than visible light. They are commercially available and currently used in various material processing applications such as bonding, cutting, welding and other material surface treatments.

LEDs provide the smallest footprint high-power emitters which can be assembled in tight arrays with spacing as small as 200 microns, which enables variable, high power density (W/cm$^2$) bonding systems. Breakthroughs in LED radiant power and intensity have enabled the displacement of xenon and mercury-vapor lamps in applications such as curing of inks and other bonding materials or compounds FIG. 6 illustrates the arrangement of one or more slow axis collimators (124) and their associated diode arrays (126) Within a beam combiner/shaper housing (128) to produce a narrow line of diode energy (130)

A slow axis collimator (SAC) is a linear arrangement of cylindrical microlenses for collimating the "slow axis" of UV and NIR diodes, arrays and/or diode bars. It is the optimal solution for producing a narrow line of high brightness diode energy. The SAC is made from high-power resistant and highly transparent fused silica material. The high surface profile quality and extremely low surface roughness, in combination with broad-band AR coatings on both interfaces, optimize performance and minimize power losses. The design is adapted for, and compatible with, the typical packaging concepts for one or more diode arrays, bars and stacks whose radiant energy enters a reflective beam combiner/shaper where the SACs produce a single, narrow line of diode energy of sufficient power and/or power density to bond and/or cure the inventive bonding materials and compositions by combining the energy of the individual diodes, arrays or bars and spatially rearranging their constituent diode beams. FIG. 6 illustrates the arrangement of one or more slow axis collimators (124) and their associated diode arrays (126) within a beam combiner/shaper housing (128) to produce a narrow line of diode energy (130). FIG. 7 illustrates the configuration of an enclosure (134) containing printhead equipment for depositing a marking material composition (132) of the present subject matter in the form of the desired mark (116) onto the substrate surface (122) traveling in the indicated direction (136) and subsequently being irradiated by a narrow line of diode energy or alternatively an oscillating laser beam (130), thereby creating a durably bonded marking in the desired form (120). Such bonded markings are thin but very durable, as illustrated by FIG. 10, which shows the cross sectional profile heights of a 150 micron wide line created by using UV LED diode energy (3.0 microns) (146), NIR diode energy (2.0 microns) (148) and laser energy (1.5 microns) (150).

The compositions must be stable at higher temperatures (i.e., about 100° C.-1000° C.) in order to withstand the effects of the chemical bonding and/or polymerization processes associated with and encountered in conjunction with different substrate materials. The nanoparticles should comply with important size limitations in order to allow for their desired color and other proper physical properties for usage in the marking fluids, materials, compositions and methodology.

In one aspect of the present subject matter, laser marking materials and compositions are provided that produce higher contrast marks with better adhesion to the substrate surface and comprise a powder or, liquid, silica based, binder system comprising micro and nano sized particles to provide color, if desired, and which eliminates the need for any laser enhancing absorber or component as described in the patents referenced in the Background. In various embodiments, these compositions can comprise nanoparticles of materials selected from the group consisting of silica, metal oxides and metal compounds comprising at least one of tungsten, molybdenum and chromium, and combinations thereof, with these nanoparticles being colloidally suspended in a liquid comprising aqueous and/or organic solvents. Additional materials, preferably as nanoparticles, can be employed, such as suitable organic, organometallic and inorganic materials, including both organic and inorganic pigments. The metal compounds can include oxides and acid salts of tungsten, molybdenum and chromium as well as compounds combining at least two of those metals, such as tungsten molybdate and molybdenum tungstate. In addition to conventional pigments, nanoparticles of noble metals (including gold, silver, platinum and palladium) can be employed, singly or in combinations with each other and/or copper. Nanoparticles of such metals are commercially available in particle sizes which will produce predictable colors, and particle sizes in the range of from about 20 to about 200 nanometers can be employed. The silica nanoparticles can have average particle sizes in the range of from about 10 to about 150 nanometers, and can be produced in ways which encapsulate both organic and inorganic pigments. The silica nanoparticles can be treated with polymeric materials such as monomer derivatives of acrylic acids (including substituted versions such as methacrylic acid) to improve their dispersibility in solvents. The complete compositions are formulated to have rheology and other properties which permit their application to substrate surfaces using printhead deposition technology. The marking compositions further comprise binder systems which are compatible with the marking composition components selected from the group consisting of tungsten, molybdenum and chromium metal compounds or combinations thereof, and the substrate material.

FIG. 9 illustrates four different XRD (X-ray diffraction) patterns at various indicated temperatures that were recorded from a series of tests on certain embodiments of molybdate, tungstate and chromate based marking material compositions, indicating the lower binding temperatures required to create the pseudo-spinels and actual spinels (within fractions of a second depending upon the radiant energy density) during the laser bonding process due to the micro and nano scale size of the marking material components. Such components contribute to the overall hardness of the resulting markings and their adhesion to the substrate surfaces. This illustrates the value of metal oxides and other compounds based upon those elements in the present marking compositions and processes.

The compositions can be applied directly to substrates in patterns intended to product markings, or using film or tape carriers. In an embodiment intended for marking temperature-sensitive substrates such as wood, cloth and paper, the marking compositions can further comprise a photoinitiator and suitable UV radiation used for irradiation. The particulate materials of the marking compositions can also be applied to substrates as dry particles, using electrostatic deposition or film or tape carriers. Further information about such carriers can be found in Applicant's '436 patent at columns 10/11.

In another aspect of the present subject matter, improved methods of forming a mark on a substrate surface are provided. These methods comprise applying a thin coating of the marking material composition, in the actual form of the decoration or mark to be applied, to a substrate surface, using well known and commercially available inkjet systems and technology and subsequently irradiating the deposited marking composition with UV LED, NIR diode, laser or other form of radiant energy such that the marking composition increases in temperature sufficiently to allow the evaporation of certain binder system components and permits the chemical bonding of the marking composition to adhere durably to the substrate surface and form a mark that has a luminance, color if desired, and the desired degree of opacity that contrasts with the substrate surface. These methods include steps of applying a layer of marking compositions of the types outlined above by the various methods specified, then irradiating the layer with a radiant energy beam which is absorbed by the nanoparticles in the composition in the form of a marking, thus forming a marking layer atop the substrate. Many types of substrates can be marked in this way, including metals and alloys thereof, ceramics and glass ceramics, glasses, solid polymers and polymer composites, natural and engineered stones, and temperature-sensitive, fiber-based materials such as wood, paper, cardboard, paperboard, woven and non-woven fabrics and leather. For the latter materials, it may be preferred to employ marking compositions comprising photoinitiators in addition to their usual ingredients and use UV radiation. The liquid compositions can applied directly by printhead deposition technology, alternatively using carriers such as films or tapes. They can also be applied as dry particulate mixtures using electrostatic deposition or similar film or tape carriers.

In another aspect of the present subject matter, a substrate having a mark is provided. The mark on the substrate surface is formed by irradiating the marking composition deposited on the substrate surface with UV LED, NIR diode, laser or other suitable types of radiant energy to create a permanent bonding or durable curing of the mark to the substrate surface. It should be apparent that the marking compositions and methods outlined above represent improvements upon existing means of marking substrates with various marking compositions and radiation sources, in that marking compositions (whether colloidal suspensions or dry particles) containing nanoparticles of silica and other materials, including silica-encapsulated pigment nanoparticles, are employed in combinations which enable radiant energy to be directly absorbed to produce marks which are superior in many ways to the best systems previously available. The advantages attained include stronger bonds, better color properties and finishes smooth enough not to retain bacteria, which poses a major achievement in the marking of medical instruments and the like. Similar improvements are obtained for the marking of fiber-based, temperature sensitive substrates using UV radiation and marking compositions comprising photoinitiators.

In further embodiments, various substrates marked with the marking compositions and methods outlined above can be obtained. The materials used for such substrates include various metals and alloys thereof, ceramics and glass ceramics, glasses, polymers and polymer composites, metal compounds and both natural and engineered stone, plus the fiber-based, temperature-sensitive materials outlined above. The marks thus applied are extremely durable, generally at least as durable as the substrate themselves.

Certain embodiments can encompass methods, materials and compositions for quickly creating permanent, color surface marks and/or decorations on metal, glass, ceramic, porcelain, natural and engineered stone, as well as plastic and polymer composite materials with high-resolution and high-contrast using laser, NIR diode or UV LED energy, comprising:

a. an interactive computer with monitor and operating system (not shown here);
b. software configured for controlling the production and printing of an image or other graphic;
c. a communications link to an inkjet printer device and/or a laser, NIR diode or UV LED marking system (not shown here) configured for controlling the printing and bonding or curing of a durable, colored, high-resolution and high-contrast image or other graphic on the surfaces of a variety of different materials.

Further embodiments include systems and methods as described above, wherein the laser marking or inkjet printing system is capable of the rapid placement of a durably cured and/or bonded color image or other graphic directly onto the surface of a substrate of metal, glass, ceramic, porcelain, natural or engineered stone, as well as plastic and polymer composites or other organic materials with high resolution and high contrast.

BRIEF DESCRIPTION OF DRAWINGS

A clear understanding of the key features of the invention summarized above may be had by reference to the below included drawings, which illustrate the methods, systems and components of the invention, although it will be understood that such drawings depict a variety of preferred embodiments of the invention and, therefore, are not to be considered as limiting its scope with regard to other embodiments which the invention is capable of contemplating. The same components are given the same identifying numerals in different figures where appropriate. Accordingly.

DETAILED DESCRIPTION OF PREFERRED EMBODIMENTS

Figure 3:
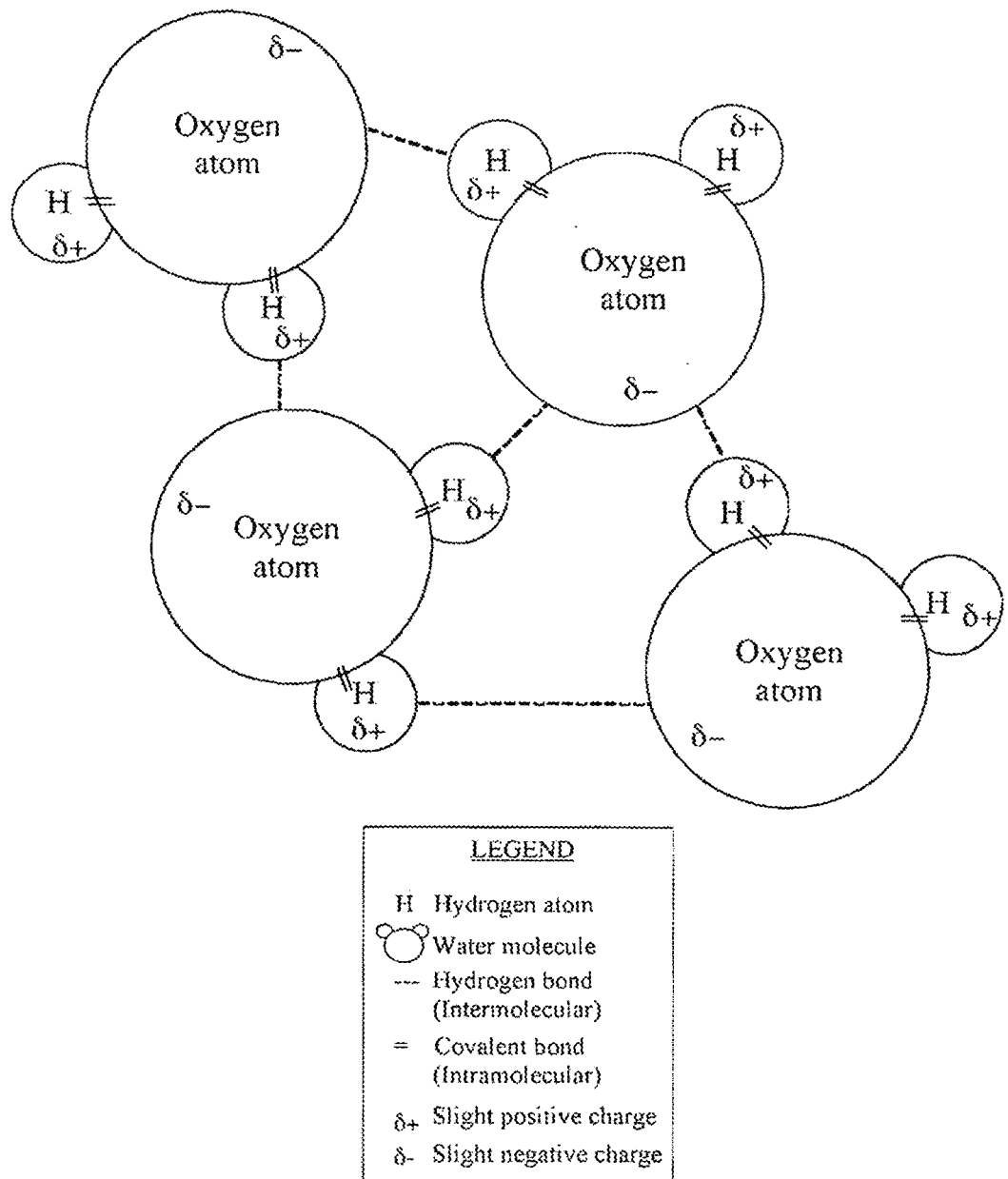
FIG. 3 provides an illustration of the Hydrogen—Oxygen chemical bond.

Physical and chemical changes induced by mechanical means during the milling processes described above can cause significant increases in the surface areas of the basic glass, ceramic, clay, metal, metal chromate, metal tungstate and metal molybdate and other metallic, organometallic, inorganic or organic compounds, materials, dispersions and solutions or combinations thereof according to the BET data. An estimation of the mean particle sizes using the BET, SEM and XRD data indicates a decrease from approximately 1 micron to the approximate 10-200 nm range and is most likely explained by the smaller primary crystallites of the elemental metals and/or other metallic, organic or inorganic materials and compounds. The solution or colloidal suspension structure confirms that the compositions contain discrete anions, cations and/or water molecules, connected through hydrogen bonds. In fact, the unique and distinguishing features of these compositions and substances are their extensive hydrogen bonding. The cations and the water molecules are positioned so as to be able to form hydrogen bonds with either the metallic or other compound oxygen atoms or water oxygen atoms. These strong hydrogen bonding interactions appear to stabilize the resulting marking, decoration or structure. These hydrogen bonds can play an important role in the mechanical and chemical properties of the laser, NIR diode and UV LED bonding fluids, materials and compositions. FIG. 3 provides an illustration of the hydrogen—oxygen chemical bonds in aqueous solutions.

As used herein, the following terms are defined:

"nanoparticle marking material", "nanoparticle compound", "nanoparticle material" or "nanoparticle composition" refer to a viscous fluid or dry powder that has an appreciable nanoparticulate content, such as at least about 5 percent by weight, preferably from about 5 to about 60 percent by weight. The nanoparticle marking materials and compositions described herein have special properties, enabling the dispersion and de-agglomeration of the nanoparticulate content in a liquid binder system (organic solvent, water or any combination thereof) with or without additives. These nanoparticle marking materials and compositions also have properties that render them ink jettable (e.g. the ability to be deposited on a substrate surface through ink jet print heads that possess small nozzles, usually in the micron range). These properties include the following: low viscosities between 1 and 200 cP (at room temperature or actual jetting temperature), surface tension between 20-40 dyne/cm for solvent based dispersions and 30-60 dyne/cm for water based dispersions, loadings of organic or inorganic additives between 1 and 60 percent by weight and particle size distribution ($D_{50}$) below 150 nm, preferably below 50 nm. The nanoparticle marking materials and compositions have stabilities sufficient to enable jetting with minimum settling and without clogging the print head or changing the properties of the marking materials and compositions. The marking materials and compositions can be deposited by different technologies including continuous ink jet, drop on demand (such as piezo and thermal) as well as additional techniques such as manual brushing, air brush, flexographic, electrostatic deposition and dry transfer from a tape or film carrier system.

The improvements of the present embodiments are generally applicable to the different formulations and characteristics of the general categories of glass, ceramic, clay, metal and other metallic, organometallic, inorganic or organic materials, including but not limited to, chromate, tungstate or molybdate bonding compounds. No additional energy absorbing enhancing components are required in the various embodiments of marking fluids, bonding materials and compositions (as is required in the glass frit or metal oxide marking compounds currently available from TherMark Holdings, Inc. of Irvine, Calif. or Ferro Corporation of Cleveland, Ohio, among others), as the significantly increased surface area of the nanoparticles within these fluids, bonding materials and compositions provides for more efficient absorption of the laser, NIR diode or UV LED energy. In addition, no specially selected laser or NIR diode or UV LED wavelength is required to excite such energy absorbing enhancing components as required in the currently available laser bonding compounds in order to produce permanent, high contrast and high resolution marks or decoration on various substrate surfaces.

A significant improvement provided by embodiments disclosed herein is the use of nanoparticle materials in colloidal dispersions which can be transferred by inkjet or other suitable means onto a substrate surface to provide thinner cured or bonded markings with better abrasion resistance and adhesion, and with color if desired. Instead of using glass frit and mixed metal oxides as described in applicant's '223 and '436 patents, nanoscale silica particles, the primary constituent of glass, can be extracted from quartz sand and then added to a water or solvent based binder system to create colloidal dispersions. For special formulations, colored forms of natural quartz can be used, including cirine (yellow), rose quartz (pink) and amethyst (violet). Such materials are commercially available from companies such as Ultratech in Boca Raton, Fla. and Nanopool GmbH in Germany. Other micro and nano sized particles can be added to the dispersion as pigments and additional binder system components, but the really interesting and unexpected result is that the silica nanoparticles form the basis for the bonding of the marking material or composition to the substrate surface due to the unique quantum physics and mechanical forces associated with nanoparticles.

Figure 1:
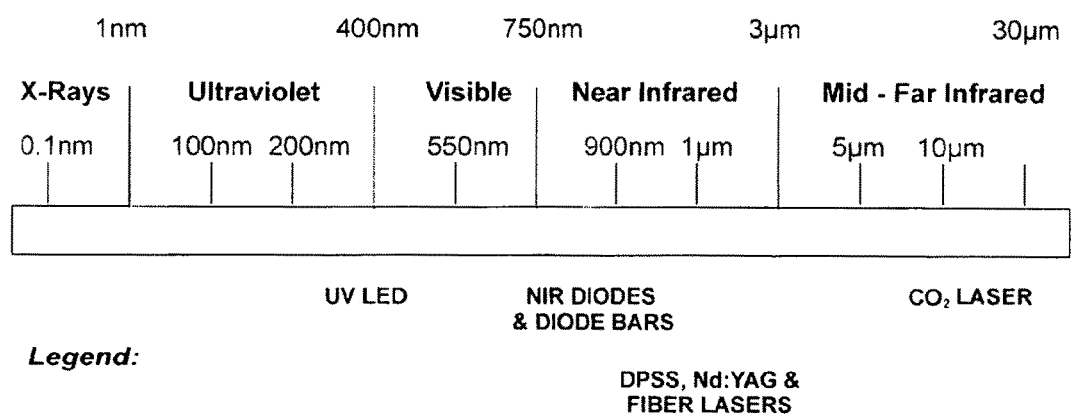
FIG. 1 shows the Electromagnetic Spectrum and illustrates the relative wavelengths of various radiant energy sources such as UV LEDs, NIR Diodes and Diode Bars, as well as Diode Pumped Solid State (DPSS), Nd:YAG, Fiber and $CO_2$ Lasers.
Figure 2:
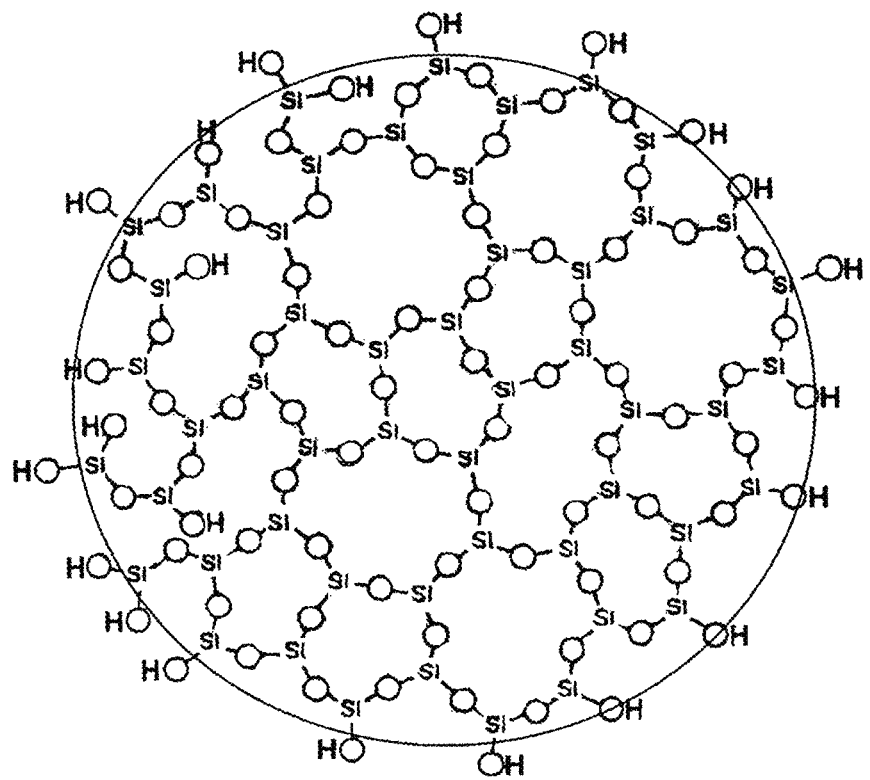
FIG. 2 provides a graphical representation of the silica nanoparticle structure and its surface chemistry which allows strong bonding capabilities.

Silica nanoparticles are particles of silicon dioxide ($SiO_2$) generally between 5 and 500 nanometers in diameter. They are usually spherical, but elongated and other novel shapes are available. FIG. 2 provides a graphical representation of the spherical silica nanoparticle structure and surface chemistry. Further detailed information about silica nanospheres can be found in Myers' article, "Silica nanoparticles with Functionalized Surface Chemistries as an Alternative to Monomers-dispersed Silica Dispersions," presented at the European Coating Congress of 2011. Silica nanoparticles generally have a density of about 2.2 grams per cubic centimeter ($cm^3$), and the surface chemistry is predominated by hydroxyl groups, with between 4 and 5 per square nanometer ($nm^2$)[1]. These hydroxyl groups, attached to silicon atoms, form silanols. Silica is naturally anionic, and always has a negative zeta potential. Its isoelectric and point of zero charge are at about pH 2. Hydroxyl groups, as used herein, and defined as functional chemical groups continuing an oxygen atom connected by a covalent bond to a hydrogen atom. As seen in FIG. 2, such groups are commonly on the surfaces of silica nanoparticles when used within marking materials and compositions. The term covalent bond is used to describe the bonds in compounds (or functional groups0 which result from the sharing of one or more pairs of electrons between atoms. The stable balance of attractive and repulsive forces between atoms when they share electrons is known as covalent bonding; see Applicant's '223 patent t column 4, line 56.

Colloidal dispersions of various oxides are widely used in marking materials and other compositions for decorative and identification purposes as well as for environmental protection and surface abrasion and chemical resistance characteristics among other properties. Due to the micro- and nano-sized particles of these types of dispersions, they can now be produced with the proper formulation, rheology and viscosity considerations required for use in suitable printhead or other suitable systems for deposition of such marking materials and other compositions onto a substrate surface for subsequent chemical bonding of the marking materials and other compositions to the substrate using near infrared (NIR) diode or conventional laser energy. The disclosed use of these ink jettable silica based dispersions is made possible by treating the silica nanoparticles with polymeric derivatives of acrylic acids, particularly methacrylic materials, or other functional chemical compounds on their surfaces, depending upon the desired binder system and target substrate, thereby making them easily dispersible in a variety of water and/or organic solvents, forming liquid binder systems for use with printhead deposition systems as well as the other conventional coating methods of the '223 and '436 patents. Alkyl alcohols with 1 to about 4 carbon atoms such as ethanol and methanol are commonly used organic solvents, and aromatic molecules such as toluene plus acetone and others can be used. In many cases, water-miscible organic solvents such as alcohols may be preferred.

Silica is one of the first commercially produced nanoparticles and remains one of the most widely used components in marking materials and compositions. Additionally, the use of certain nanoparticle metal oxides in colloidal dispersions can greatly improve the look, color, durability and performance of NIR diode and laser bondable marking materials and compounds. Silica's natural glass-like hardness imparts scratch-resistance to these marking materials and compounds while providing a clear, high-gloss finish, due to the active surface chemistry of the silica and other metal oxide nanoparticles which also facilitates their uniform dispersion and distribution throughout the liquid binder system. Some of the most effective metal oxides are as disclosed in Applicant's '436 Patent at columns 11/12.

Colloidal silica nanoparticles are most commonly incorporated into making materials and compositions to provide scratch and abrasion resistance in substrate markings, but can also be used to enhance composite strength, modulus, control refractive index and provide a host of other surface properties including, but not limited to UV protection and antiblocking properties, self-cleaning properties, porosity, surface roughness or smoothness, and hydrophilicity. Nanoscale silica is used to provide scratch and abrasion resistance to compounds because it has a natural Mohs hardness of 6-7, is optically colorless, and imparts a glossy finish to bonded materials. Silica particles that extend slightly above the surface of the bonded material become the point of first contact for foreign materials, keeping them from making full contact with the marking surface.

Figure 5A:
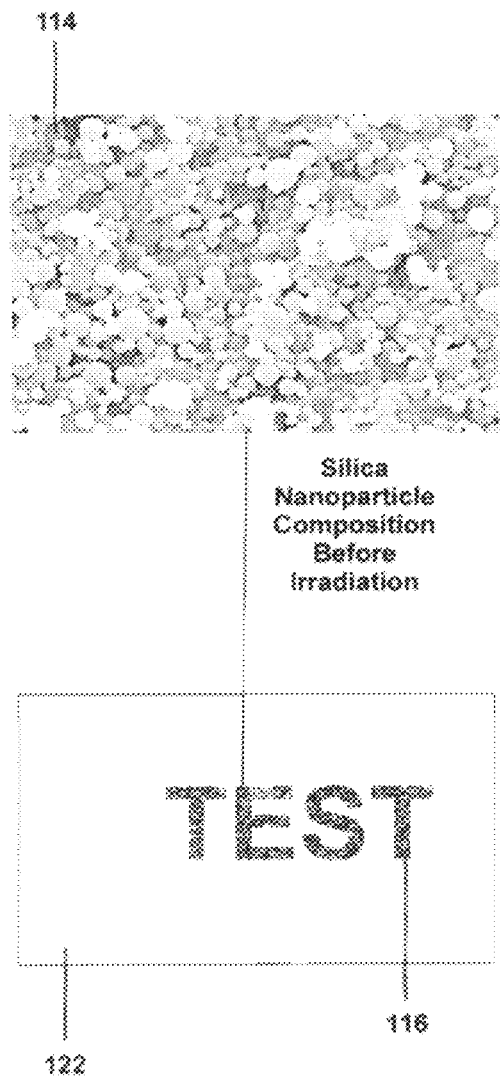
FIG. 5a shows a photomicrograph of the marking material composition and its component elements (114) after deposition onto the substrate surface (122) in the form of the desired marking (116) prior to irradiation.
Figure 5B:
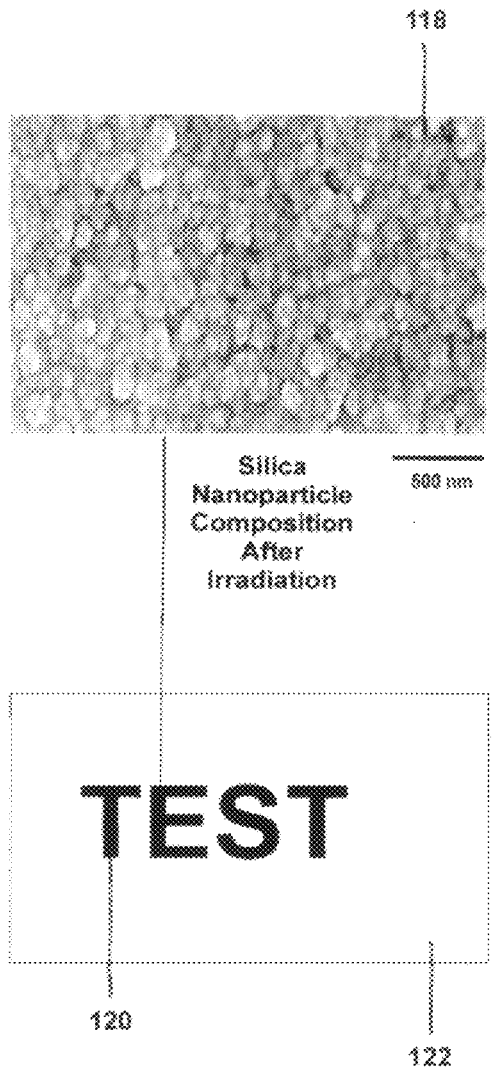
FIG. 5b shows a photomicrograph of the bonded marking material composition (118) durably bonded in the form of the desired marking (120) to the substrate surface (122) subsequent to irradiation.
Figure 6:
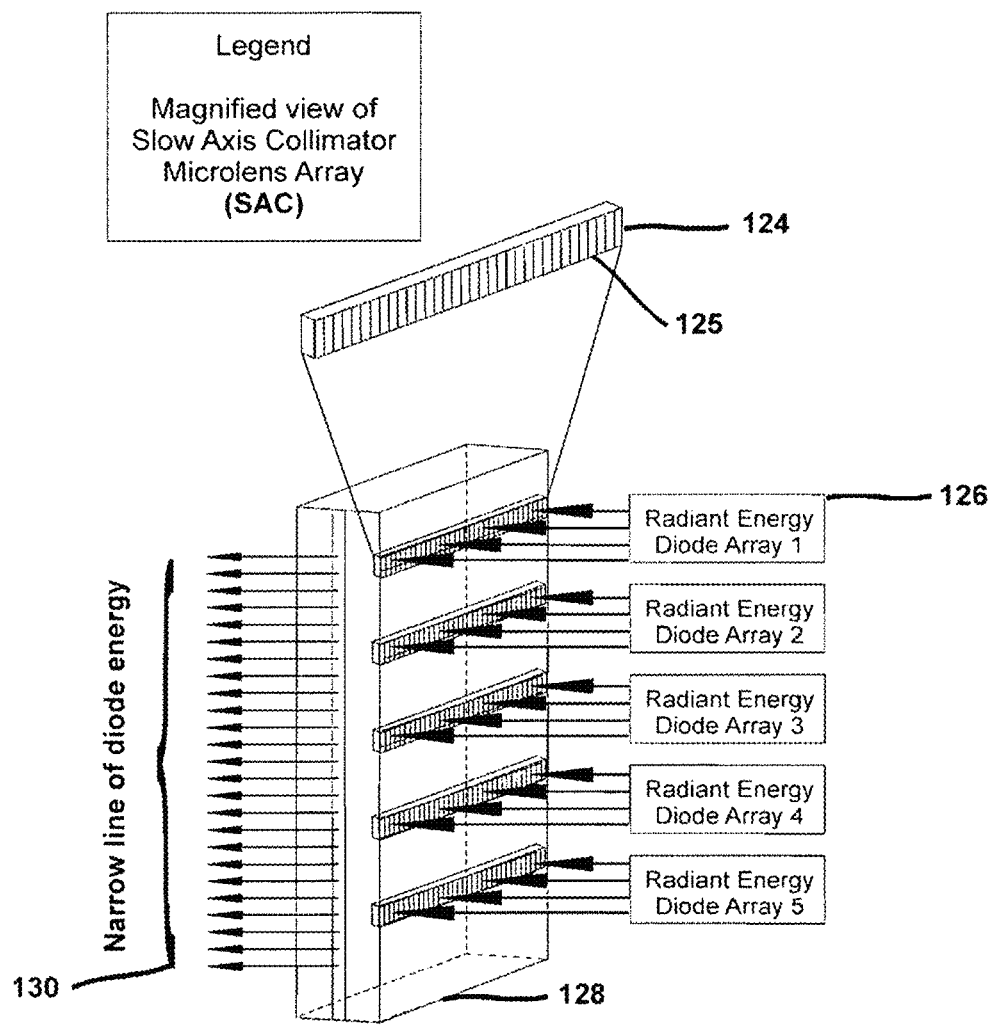
FIG. 6 illustrates the arrangement of one or more slow axis collimators (124) and their associated diode arrays (126) within a beam combiner/shaper housing (128) to produce a narrow line of diode energy (130).
Figure 7:
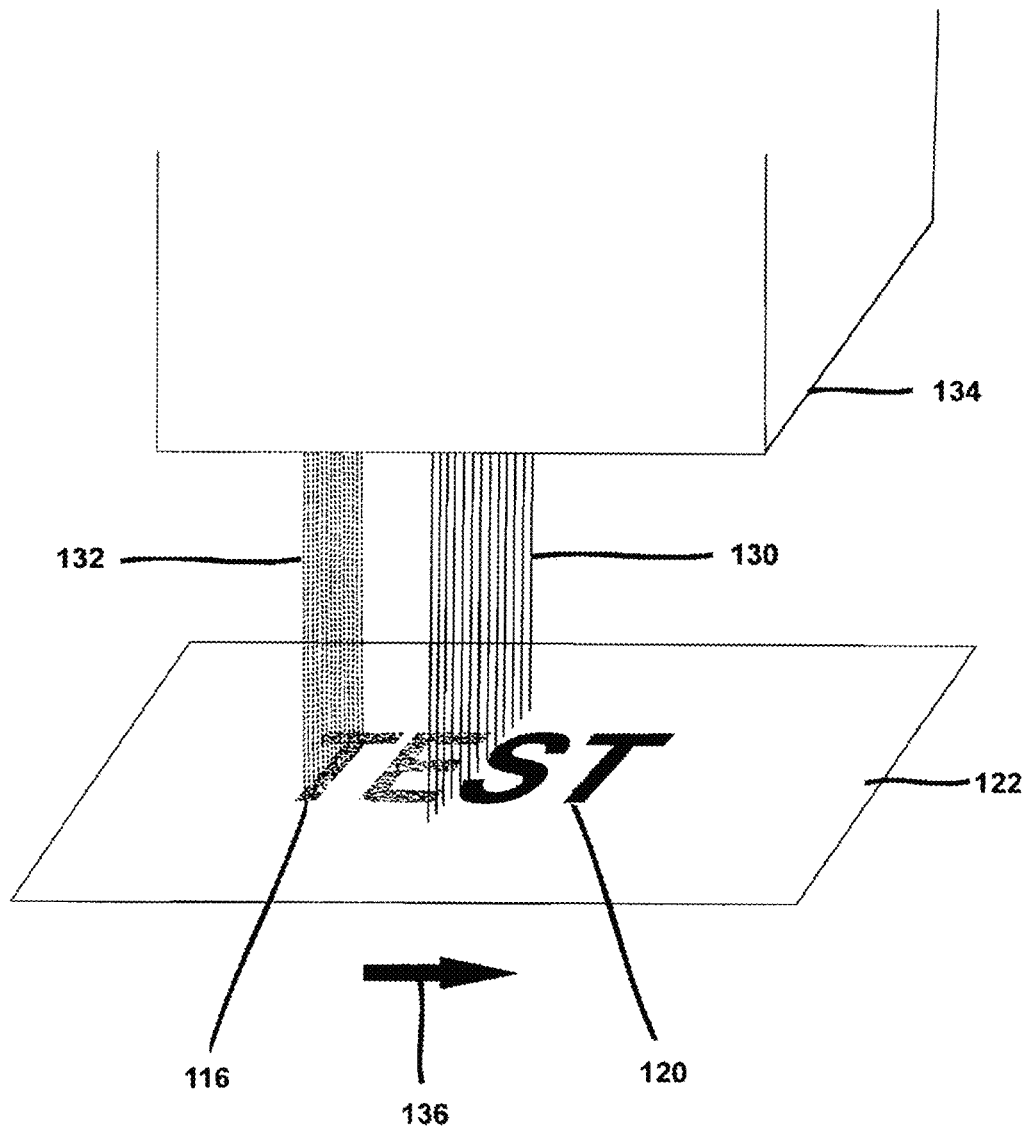
FIG. 7 illustrates the configuration of an enclosure (134) containing printhead equipment for depositing a marking material composition (132) in the form of the desired mark (116) onto the substrate surface (122).
Figure 8:
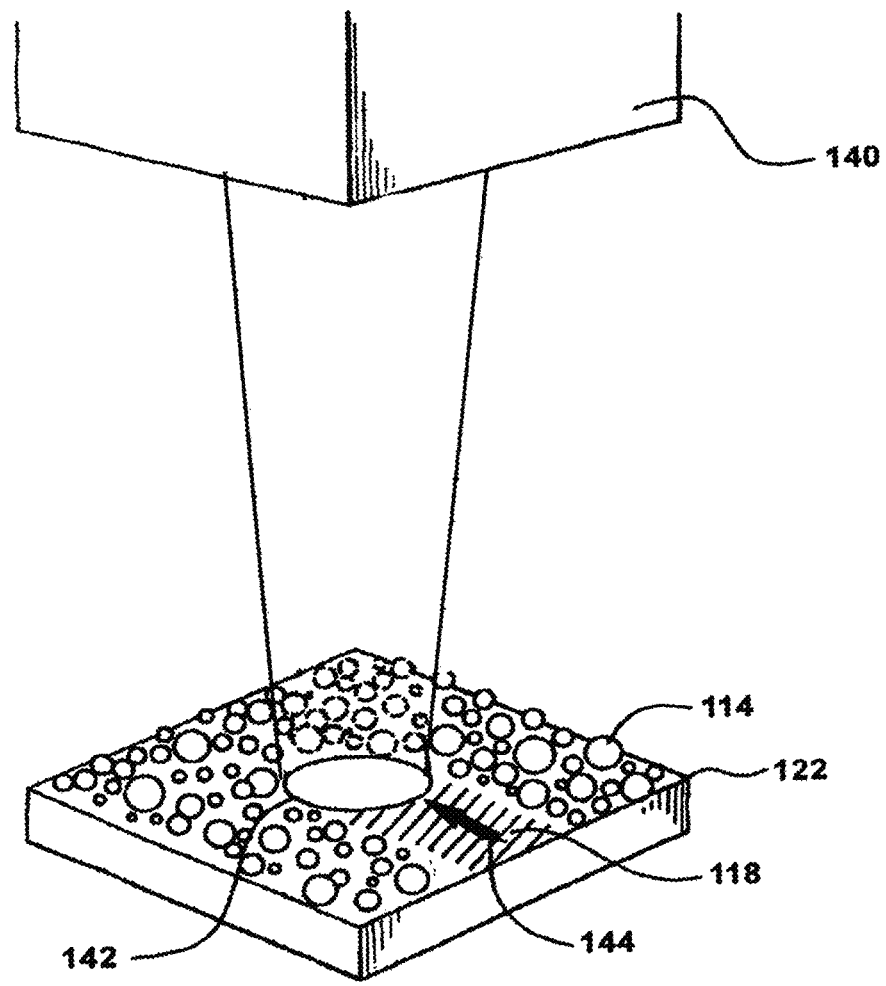
FIG. 8 illustrates the configuration of a laser enclosure (140) containing the laser beam steering mechanism to move a focused laser spot (142) over the deposited marking material composition (114) on the substrate surface (122).
Figure 9:
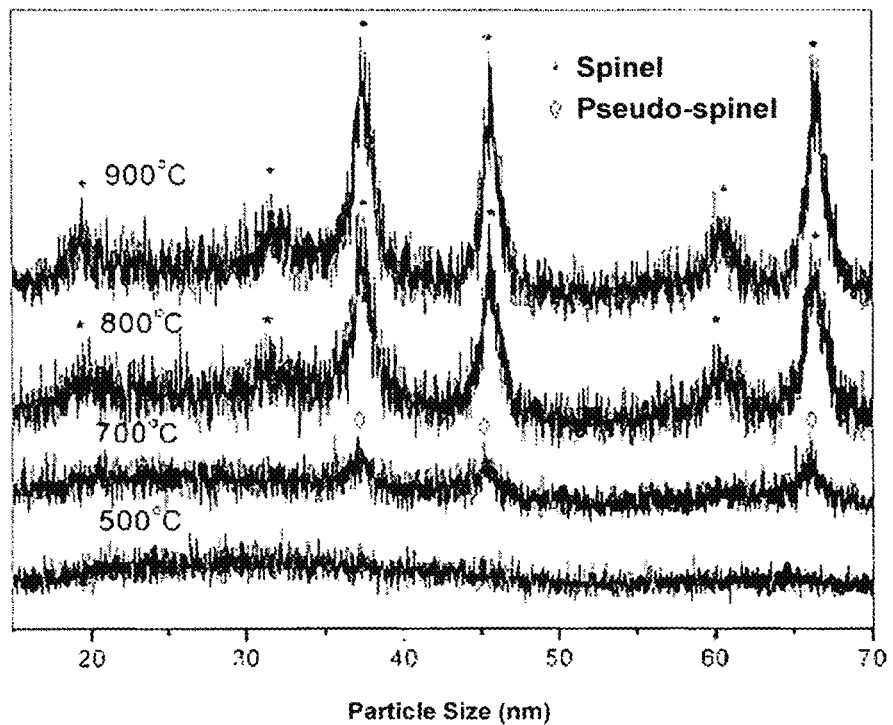
FIG. 9 illustrates four different XRD patterns that were recorded from a series of tests on molybdate, tungstate and chromate based marking material compositions indicating the lower binding temperatures required to create pseudo-spinels and actual spinels markings during the laser bonding process.
Figure 10:
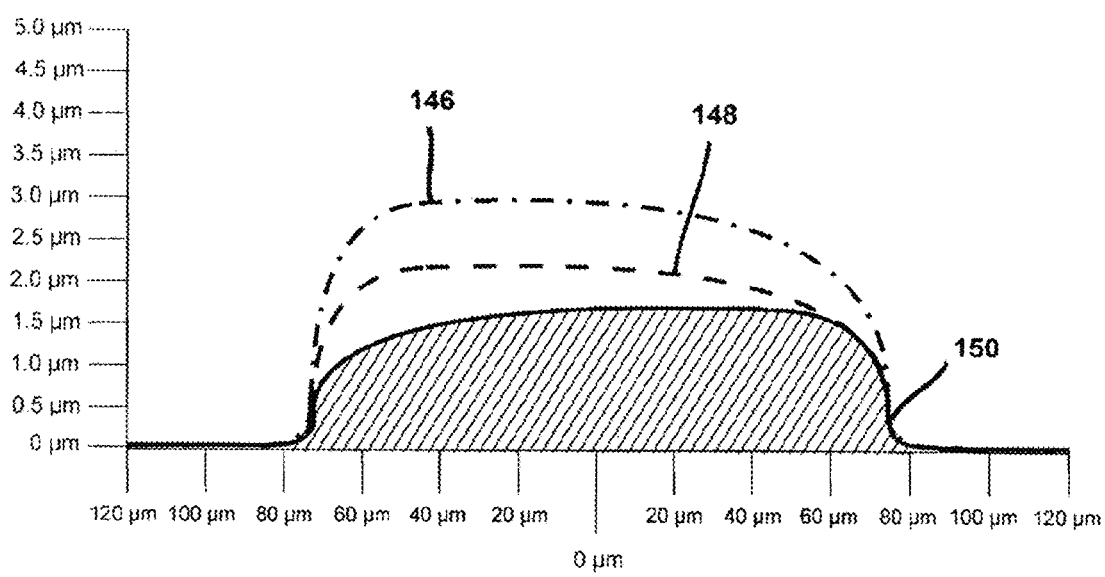
FIG. 10 illustrates the cross sectional profile height of a 150 micron wide line created by using UV LED diode energy (3.0 microns) (146). NIR diode energy (2.0 microns) (148) and laser energy (1.5 microns) (150).

The orientation of the silica or silica encapsulated nanoparticles within a mixed metal oxide marking material or composition cured into a hard coating is illustrated in FIG. 3 of the Myers article, supra. Note that the nanoparticles which do not protrude from the surface do not have an effect on scratch resistance, but may provide other benefits. This is further illustrated by FIG. 5a, which shows a photomicrograph of a marking material composition and its component elements (114) after deposition onto substrate surface (122) in the form of the desired marking (116) prior to irradiation. FIG. 5b shows a photomicrograph of the bonded marking material composition (118) durably bonded in the form of the desired marking (120) to the substrate surface (122) subsequent to irradiation Many colorant, anti-scratch and anti-abrasion properties for such marking materials and compounds require optical clarity, therefore a particle diameter below 100 nanometers, and ideally below 50 nanometers is used. Silica solids loading for such applications is usually in the 5-10 percent by weight range for optimal color and scratch resistance without compromising optical clarity, coating abrasion resistance and strength of adhesion to the substrate.

Figure 4:
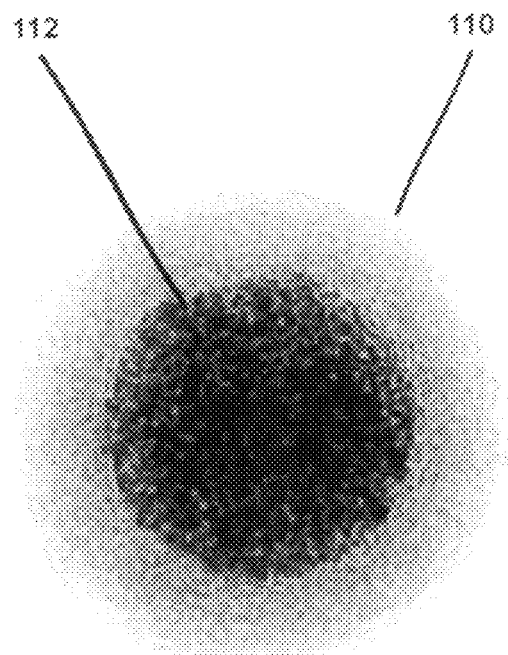
FIG. 4 shows a sectional photomicrograph of a silica shell (110) about 50 nm in thickness encapsulating a pigment element (112) of about 100 nm in diameter.

Layer-by-layer assembly techniques and sol-gel processes have been adopted to coat the nano silica layers on the surface of organic pigment particles. The thickness of the nano silica shell on the organic pigment particle surface is controlled by adjusting the timing of the application of the individual nano silica layers, resulting in the modified organic pigments having more suitable characteristics for optimal use in liquid dispersions than the original organic pigments. FIG. 4 shows a sectional photomicrograph of a silica nanoparticle shell (110) about 50 nm in thickness encapsulating a pigment element (112) of about 100 nm in diameter Another improvement in certain of the present embodiments is the application of a thinner layer of the marking fluid, bonding material or composition to a carrier film or tape, placing the carrier film or tape in contact with the substrate surface to be marked, and then irradiating the carrier film with sufficient laser, NIR diode or UV LED energy, in accordance with the form of a marking or decoration, so that the mark is durably bonded to the substrate surface.

Organic and inorganic pigments can be coated with nano-silica particles via layer-by-layer self-assembly techniques, the result being that the coating of nano-silica on the surfaces of organic pigments can improve the thermal stability, wettability, acid, alkali and abrasion resistance, as well as the weatherability of the organic pigments.

Silica encapsulated organic pigments are widely used in various coatings, plastics, monomers and oligomers. They are commercially available from companies such as Xerox Corporation, Stamford, Conn.; Mayan Pigments, Inc. El Paso, Tex.; Sun Chemical Corporation, Parsippany, N.J.; and BASF in Germany; among many others. The advantages of such encapsulated organic pigments are bright colors and wide ranging tinting strength. Many colorant, anti-scratch and anti-abrasion properties for such marking materials and compounds require optical clarity, therefore particle diameters below 100 nanometers, and ideally below 50 nanometers are used. The silica solids loading for such applications is usually in the 5-10 percent range for optimal color and scratch resistance without compromising optical clarity, coating abrasion resistance and strength of adhesion to the substrate.

Another improved embodiment is the application of the marking fluid, bonding material or composition, in the form of the desired mark or decoration, onto substrate surfaces using existing printhead and inkjet technology due to the sub-micron and nanoparticle size of components used in these fluids, inks, bonding materials and compositions.

More significant, from the standpoint of the problems solved by these various embodiments, is the fact that durable, high contrast and high resolution marks can be produced on the various substrate surfaces using lower levels of laser, NIR diode or UV LED energy and/or faster processing speeds.

The ceramic, glass frit and metal oxide marking materials and compounds usually contained in water or solvent based binder systems are "fired" onto the substrate surface using the radiant energy methods disclosed in the '223 and '436 patents, which reach temperatures up to 2000° F. and permanently bond to the substrate structure.

Using light instead of heat, the UV curing process is based on a photochemical reaction. The organic or modified organic pigmented marking materials and compositions in the present subject matter are usually mixed with liquid monomers and oligomers as well as a small percentage of photoinitiators, deposited onto the substrate surface and then exposed to UV energy. Depending on energy density, in a fraction of a second the marking materials and compositions harden to form a durable bond with the substrate surface whether it is wood, plastic, glass, metal, stone or some other heat-sensitive substrate. UV LED curing systems deliver greater flexibility than UV lamps, such as Xenon, due to a wide range of variable power and precisely focused or area defined reflector geometries.

UV curable marking materials and compositions were first used as an alternative to water and solvent-based products using conventional heat and/or radiant energy drying methods to achieve the water or solvent evaporation and create the bond to the substrate. This process shrinks the initial application of the marking materials and compositions by as much as 50 volume percent and creates environmental pollutants. In UV curing, there is no water or solvent to evaporate, no environmental pollutants, no loss of coating thickness, and no loss of volume. This results in higher productivity with a reduction in waste, energy use and pollutant emissions.

These UV curable marking materials and composition can create different appearances. Transparent or opaque colors can be applied to create striking special effects that are not possible with fired ceramic and/or metal oxide decorations. Examples of these special effects include fluorescent (day glow), phosphorescent (glow in the dark), metallic, pearlescent, thermochromic (i.e., changes color when hot or cold), photochromic (changes color in sunlight), glitter, scented, prismatic, or flip/flop color shifts (i.e., color changes with viewing angle).

The improvements of the present embodiments are also applicable to decreasing the possibility of clogging the nozzles of inkjet printheads, aerosol spray cans or air brushes used to apply the marking fluids, bonding materials and compositions to the substrate surface to be marked due to the much smaller particle sizes; and the agglomeration and dispersion stability characteristics of the NIR diode or UV LED fluids, bonding materials and compositions.

These techniques are especially valuable in the medical field. Typically bacteria are a few microns in size and have a number of different shapes, ranging from spheres to rods and spirals. Bacteria were among the first life forms to appear on earth and are present in most of its habitats. Bacteria inhabit soil, water, and live in symbiotic and parasitic relationships with plants and animals. Liquid silica nanoparticle binder systems are transparent, non-toxic, and can protect virtually any surface against almost any damage from hazards such as water, acids, UV radiation, dirt, heat, and bacterial infestations. The nano-scale glass coating bonds to the surface because of the quantum forces involved and has a long-lasting antibacterial effect because microbes landing on the marking surface cannot embed themselves to divide or replicate. Applicant has found that even when metal substrates thus marked are dissolved in acid, the marking material is the last to disappear, creating a sort of "acid test."

These laser markings are smooth and resistant against acids, cleaning solutions or body liquids. The marking process does not adversely affect or damage the substrate surface structure—which means that no germs can settle or be retained, and medical instruments and devices can easily be kept clean and sterile. Even if implants remain in the body for a long time, no substances from the mark that might harm the individual will become detached. The laser marking is clearly visible and can be electronically imaged even when used heavily and after numerous cleaning and sterilizing cycles. This guarantees individual part identification and traceability Although the present invention has been described with reference to the disclosed embodiments, numerous modifications and variations can be made and still produce results coming within the scope of the claimed embodiments. No Having described and disclosed my invention, I claim:

1. A nanoparticle-based marking composition compounded for a thermally activated, chemically based marking method, comprising a marking material containing at least one pigment encapsulated in silica nanoparticles and further comprising nanoparticles of materials selected from the group consisting of silica, metal oxides and metal compounds comprising at least one of tungsten, molybdenum and chromium, and combinations thereof, wherein these materials are all colloidally suspended in a liquid comprising aqueous and/or organic solvents.

2. The composition of claim 1 which comprises silica nanoparticles having average sizes in the range of from about 10 to less than 100 nanometers.

3. The composition of claim 1 wherein said pigment is an organic pigment.

4. The composition of claim 1 wherein said pigment is an inorganic pigment.

5. The composition of claim 1 which is formulated to have rheology and other physical properties to permit application to a substrate surface by printhead deposition technology.

6. The composition of claim 1 wherein at least a portion of said silica nanoparticles are treated with monomer derivatives of acrylic acid to improve their dispersability in aqueous and/or organic solvents.

7. The composition of claim 1 which comprises organic solvents selected from the group consisting of short-chain alcohols, ketones, acetone and toluene.

8. The composition of claim 1 which further comprises nanoparticles of at least one noble metal selected by type, physical shape and size to provide predetermined colors.

9. The composition of claim 8 wherein said noble metal nanoparticles have average particle sizes in the range of from about 10 to about 200 nanometers.

10. The composition of claim 8 wherein said noble metals comprise gold and/or silver.

11. The composition of claim 1 which further comprises nanoparticles of copper, optionally in combination with nanoparticles of at least one noble metal, selected to provide predetermined colors.

12. A method of marking the surface of a substrate comprising steps of: applying a layer of a marking composition containing at least one pigment encapsulated in silica nanoparticles and further comprising nanoparticles of materials selected from the group consisting of silica, metal oxides and metal compounds comprising at least one of tungsten, molybdenum and chromium, and combinations thereof, wherein these materials are all colloidally suspended in a liquid comprising aqueous and/or organic solvents, to said substrate, and irradiating said layer with a radiant energy beam which is absorbed by said nanoparticles in the form of a marking to be applied, thereby forming a marking layer atop said substrate.

13. The method of claim 12 wherein said substrate comprises a metal or alloy thereof.

14. The method of claim 12 wherein said substrate comprises a ceramic or glass ceramic.

15. The method of claim 12 wherein said substrate comprises a solid polymer or polymer composite.

16. The method of claim 12 wherein said substrate comprises stone and/or engineered stone.

17. The method of claim 12 wherein said substrate comprises fiber-based materials selected from the group consisting of wood, paper, cardboard, paperboard, woven and non-woven fabrics and leather.

18. The method of claim 17 wherein said composition further comprises a photoinitiator and said radiant energy is from a UV source.

19. The method of claim 12 wherein said marking composition is applied as a fluid by means of printhead technology.

20. The method of claim 12 wherein the particulate ingredients of said marking composition are applied in powder form.

21. The method of claim 20 wherein said particulate ingredients are applied by electrostatic means.

22. The method of claim 20 wherein said particulate ingredients are applied via a film or tape carrier which is applied to said substrate.

23. The method of claim 12 wherein said marking composition is applied via a film or tape carrier which is applied to said substrate.

24. In a thermally activated, chemically based marking method comprising the steps of:

applying a layer of a marking composition to the surface of a substrate and irradiating said layer with radiant energy which is absorbed by at least one component of said marking composition, the improvement comprising the use of marking compositions comprising amounts of at least one pigment encapsulated in silica nanoparticles and further comprising nanoparticles of materials selected from the group consisting of silica, metal oxides and metal compounds comprising at least one of tungsten, molybdenum and chromium, and combinations thereof, wherein these materials are all colloidally suspended in a liquid comprising aqueous and/or organic solvents, said amounts being sufficient to produce a marking layer atop said substrate having improved properties including at least one of stronger bonds, better color properties, and finishes smooth enough not to retain bacteria.

25. The improvement of claim 24 wherein said marking composition further comprises a photoinitiator and said radiant energy is from a UV source.

26. Substrates having surfaces comprising at least one material selected from the group consisting of metals and alloys thereof, ceramics, glasses, polymers and polymer composites, metal compounds and natural and engineered stone, said surfaces being durably marked by the use of layers of marking compositions comprising colloidal suspensions of at least one pigment encapsulated in silica nanoparticles and further comprising nanoparticles of silica, metal oxides, metal compounds comprising at least one of tungsten, molybdenum and chromium, and combinations thereof, which layers have been irradiated with radiant energy sufficient to produce durable markings from said nanoparticles.

* * * * *